United States Patent
Lee et al.

(10) Patent No.: US 8,959,614 B2
(45) Date of Patent: Feb. 17, 2015

(54) APPARATUS AND METHOD FOR PROVIDING VIRTUAL PRIVATE NETWORK SERVICE BASED ON MUTUAL AUTHENTICATION

(75) Inventors: Seok-Min Lee, Seongnam Si (KR); Nam-Soo Jeon, Suwon Si (KR); Seung-Woo Nam, Seoul (KR); Jin-Yong Kim, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 74 days.

(21) Appl. No.: 13/306,249

(22) Filed: Nov. 29, 2011

(65) Prior Publication Data
US 2013/0081132 A1    Mar. 28, 2013

(30) Foreign Application Priority Data
Sep. 28, 2011   (KR) .................. 10-2011-0098387

(51) Int. Cl.
*H04L 29/06* (2006.01)
*H04L 12/46* (2006.01)

(52) U.S. Cl.
CPC ......... *H04L 63/0272* (2013.01); *H04L 12/4641* (2013.01)
USPC ............................................. 726/15; 713/153

(58) Field of Classification Search
CPC ...................... H04L 63/0272; H04L 63/4641
USPC .......................................................... 726/15
See application file for complete search history.

(56) References Cited

U.S. PATENT DOCUMENTS

2006/0090074 A1*   4/2006   Matoba .................. 713/171
2007/0299954 A1*   12/2007  Fatula ..................... 709/223

FOREIGN PATENT DOCUMENTS

| JP | 2011-24065 A | 2/2011 |
| KR | 10-0471790 B1 | 3/2005 |
| KR | 10-2006-0126952 A | 12/2006 |

OTHER PUBLICATIONS

Communication dated Apr. 8, 2013 issued by the Korean Intellectual Property Office in counterpart Korean Patent Application No. 10-2011-0098387.

\* cited by examiner

*Primary Examiner* — Hadi Armouche
*Assistant Examiner* — Dao Ho
(74) *Attorney, Agent, or Firm* — Sughrue Mion, PLLC

(57) ABSTRACT

An apparatus and method for providing a virtual private network (VPN) service based on mutual authentication are provided, the apparatus including a storage unit configured to store a first public key and a second public key; an authentication unit configured to authenticate a VPN server with the first public key and to authenticate a user device with the second public key; and a tunnel management unit configured to generate a first VPN tunnel and a second VPN tunnel to relay data between the user device and the VPN server based on the authentication of the VPN server and the user device by the authentication unit.

17 Claims, 9 Drawing Sheets

APPARATUS AND METHOD FOR PROVIDING VIRTUAL PRIVATE NETWORK SERVICE BASED ON MUTUAL AUTHENTICATION

CROSS-REFERENCE TO RELATED APPLICATION

This application claims priority from Korean Patent Application No. 10-2011-0098387, filed on Sep. 28, 2011, the disclosure of which is incorporated herein by reference in its entirety.

BACKGROUND

1. Field

The present inventive concept relates to an apparatus and method for providing a virtual private network (VPN) service based on mutual authentication, and more particularly, to an apparatus and method for providing a VPN service operating at an application layer having improved reliability.

2. Discussion of Related Art

In distributed enterprise environments, an exemplary approach for connecting a head office and branch offices includes establishing a network between the offices using leased lines or frame relays. However, this approach has a disadvantage in that the network line cost for building up the leased lines or frame relays is relatively expensive.

Therefore, virtual private network (VPN) technology, which employs a low cost Internet-based public network compared to the leased lines or frame relays, is being more widely used. The VPN is a technology that virtually establishes private communication networks by connecting the head office and remote terminals (branches) using existing public networks to ensure secure communications.

A related art VPN is typically operated at a transport layer and a network layer using a protocol such as Internet Protocol Security (IPSec), Secure Sockets Layer (SSL), and so on. However, this related art VPN is only operable at layers below the transport layer. As a result, network scalability (e.g., by additional relays) is difficult to achieve and client portability is decreased due to the high dependency upon hardware.

To overcome this disadvantage, a VPN scheme operating at an application layer has been proposed, in which a Secure Shell (SSH) protocol is employed. In a VPN operating at the application layer, a network may be scaled relatively easily, but only a simple path is provided when connecting via a relay server, and thus the reliability of the network is decreased. Also, when a hosted VPN service in which a plurality of VPN servers are connected to one relay server is provided, VPN services should be provided to several enterprises rather than just one enterprise, and thus problems may be caused by differing network security schemes, and collisions of internet protocol (IP) traffic may occur.

Korean Patent Application Publication No. 10-2006-0126952 discloses a primary protocol service which controls access of a client to a host service. A ticket agency transmits a first ticket and a second ticket to the client and the primary protocol service, respectively. The primary protocol service and the host service receiving the tickets can communicate with each other using a secondary protocol. Also, the primary protocol service can communicate with the client using a primary protocol encapsulated within the secondary protocol.

The primary protocol service and the client receiving the tickets from the ticket agency transmit and receive data through protocol encapsulation, thereby maintaining the data security and reliability. However, authentication of the client is implemented not by an active request of the client to the primary protocol service but by a selection of the ticket agency. Furthermore, there is no procedure for authentication of the host service. Thus, the reliability of a secure network between the client and the host service by the relaying of the primary protocol service may be decreased.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a virtual private network (VPN) service apparatus which receives a first public key and a second public key, wherein the first public key is received from a VPN server and provides access to a user device to a private network, and the second public key is received from the user device, the apparatus, the apparatus including: a storage unit configured to store the first public key and the second public key; an authentication unit configured to authenticate the VPN server using the first public key and to authenticate the user device using the second public key; and a tunnel management unit configured to generate a first VPN tunnel and a second VPN tunnel which respectively relay data between the user device and the VPN server, wherein the first VPN tunnel is configured to relay the data between the VPN server and the VPN service apparatus based on the authentication of the VPN server by the authentication unit, and wherein the second VPN tunnel is configured to relay the data between the VPN service apparatus and the user device based on the authentication of the user device by the authentication unit.

The data relayed between the user device and the VPN server through the first and second VPN tunnels may be encoded by a first encryption key preset between the user device and the VPN server.

The VPN service apparatus may further include a security processing unit configured to: decode user device data, if the data is received from the user device, with a second encryption key preset in conjunction with the user device, encode first encoded data by encoding the decoded user device data with a third encryption key preset in conjunction with the VPN server, and transmit the first encoded data to the VPN server; and decode VPN server data, if the data is received from the VPN server, with the third encryption key, encode second encoded data by encoding the decoded VPN server data with the second encryption key, and transmit the second encoded data to the user device.

If a request to access the VPN server is received from the user device, the apparatus may further include a connection management unit configured to determine whether to connect the VPN server to the user device based on information in an authentication database.

The VPN service apparatus may further include a connection management unit, wherein if a request to access the VPN server is received from the user device, and the VPN server is included among a plurality of VPN servers having a same identification (ID), the apparatus, the connection management unit is configured to determine whether to connect the VPN server to the user device based on whether a load resulting from access of the user device would be equally distributed among the plurality of VPN servers having the same ID.

Wherein each of the plurality of VPN servers may have a different sub-ID.

The VPN service apparatus may further include a routing unit, wherein if a request to access the VPN server is received from the user device, the routing unit configured to establish a routing path for the user device to be connected to the VPN service apparatus generating the first VPN tunnel in conjunction with the VPN server accessible by the user device.

The tunnel management unit may receive a third public key through the second VPN tunnel from the user device and transmit the third public key through the first VPN tunnel to the VPN server.

According to an aspect of an exemplary embodiment, there is provided a virtual private network (VPN) service method for providing access of a user device to a private network through a VPN server, the method including: authenticating the VPN server with a first public key received from the VPN server; authenticating the user device with a second public key received from the user device; and generating a first VPN tunnel and a second VPN tunnel which respectively relay data between the VPN server and the user device, wherein the first VPN tunnel relays the data to and/or from the VPN server based on the authenticating of the VPN server, and wherein the second VPN tunnel relays the data to/from the user device based on the authenticating of the user device.

The data relayed between the user device and the VPN server through the first and second VPN tunnels may be encoded by a first encryption key preset between the user device and the VPN server.

The VPN service method may further include: decoding user device data, if the data is received from the user device, with a second encryption key preset in conjunction with the user device; encoding first encoded data by encoding the decoded user device data with a third encryption key preset in conjunction with the VPN server; transmitting the first encoded data to the VPN server; decoding VPN server data, if the data is received from the VPN server, with the third encryption key, encode second encoded data by encoding the decoded VPN server data with the second encryption key; and transmitting the second encoded data to the user device.

If a request to access the VPN server is received from the user device, the method may further include a connection management unit configured to determine whether to connect the VPN server to the user device based on information in an authentication database.

If a request to access the VPN server is received from the user device, and the VPN server is included among a plurality of VPN servers having a same identification (ID), the apparatus, the connection management unit may be configured to determine whether to connect the VPN server to the user device based on whether a load resulting from access of the user device would be equally distributed among the plurality of VPN servers having the same ID.

The VPN service method may further include, wherein if a request to access the VPN server is received from the user device, establishing a routing path for the user device to be connected to a VPN service apparatus generating the first VPN tunnel in conjunction with the VPN server accessible by the user device.

The VPN service method may further include: receiving a third public key through the second VPN tunnel; and transmitting the third public key through the first VPN tunnel to the VPN server.

According to an exemplary embodiment, there is provided a non-transitory computer-readable recording medium recording a program thereon for executing the virtual private network service method for providing access of a user device to a private network through a VPN server, the method including: authenticating the VPN server with a first public key received from the VPN server; authenticating the user device with a second public key received from the user device; and generating a first VPN tunnel and a second VPN tunnel which respectively relay data between the VPN server and the user device, wherein the first VPN tunnel relays the data to and/or from the VPN server based on the authenticating of the VPN server, and wherein the second VPN tunnel relays the data to/from the user device based on the authenticating of the user device.

According to an aspect of an exemplary embodiment, there is provided a non-transitory computer-readable recording medium recording a program thereon for executing a method, which is implemented in a user device and provides access to a private network through a virtual private network (VPN) server and a VPN service apparatus, the method including: requesting the VPN server to perform an initial authentication; if the initial authentication by the VPN server is successful, generating a first public key, a first private key, a second public key and a second private key; registering the first public key with the VPN service apparatus and obtaining a first authentication from the VPN service apparatus with the first public key; registering the second public key with the VPN server and obtaining a second authentication from the VPN server with the second public key; and transmitting and/or receiving data to/from the VPN server via the VPN service apparatus, wherein the data is transmitted and/or received through a first VPN tunnel which is between the VPN service apparatus and the user device.

The non-transitory computer-readable recording medium, wherein transmitting and/or receiving the data to/from the VPN server includes encoding the data to be transmitted to the VPN server with a first encryption key preset in conjunction with the VPN server, and decoding the data received from the VPN server with the first encryption key.

The non-transitory computer-readable recording medium, wherein transmitting and/or receiving the data to/from the VPN server includes encoding the data to be transmitted to the VPN server with a first encryption key preset in conjunction with the VPN server and re-encoding the data with a second encryption key preset in conjunction with the VPN service apparatus; and decoding the data received from the VPN server with the second encryption key, and re-decoding the data with the first encryption key.

According to an aspect of an exemplary embodiment, there is provided a virtual private network (VPN) providing apparatus for providing access of a user device to a private network, the apparatus including: a VPN key management unit configured to generate a first public key and a first private key to register the first public key with a VPN service apparatus relaying transmission and/or reception of data to/from the user device, and to obtain a registration of a second public key generated by the user device; a VPN authentication unit configured to authenticate the user device with the second public key; and a VPN data transceiver unit configured to transmit and/or receive the data to/from the user device via the VPN service apparatus through a first VPN tunnel, wherein the data is relayed between the VPN providing apparatus and the VPN service apparatus through the first VPN tunnel if the VPN providing apparatus is authenticated with the first public key.

The data to be transmitted to the user device via the VPN data transceiver unit may be encoded with a first encryption key preset in conjunction with the user device, and the data received from the user device via the VPN data transceiver unit may be decoded with the first encryption key.

The VPN providing apparatus may further include a VPN security processing unit configured to encode the data to be transmitted to the user device with a first encryption key preset in conjunction with the user device and re-encode the data with a second encryption key preset in conjunction with the VPN service apparatus; and decode the data received from the user device with the second encryption key, and re-decode the data with the first encryption key.

According to an aspect of an exemplary embodiment, there is provided a virtual private network (VPN) providing method for allowing access of a user device to a private network via a VPN service apparatus relaying transmission and reception of data to and from the user device, the method including: generating a first public key and a first private key; registering the first public key with the VPN service apparatus; obtaining a registration of a second public key generated by the user device; authenticating the user device with the second public key; and transmitting and/or receiving data to/from the user device through a first VPN tunnel, wherein the data is relayed through the first VPN tunnel which is between the VPN service apparatus and the user device if the user device is authenticated as a result of the authenticating.

The data to be transmitted to the user device in transmitting and/or receiving data to/from the user device may be encoded with a first encryption key preset in conjunction with the user device, and the data received from the user device may be decoded with the first encryption key.

The VPN providing method may further include encoding the data to be transmitted to the user device with a first encryption key preset in conjunction with the user device and re-encoding the data with a second encryption key preset in conjunction with the VPN service apparatus, and decoding the data received from the user device with the second encryption key and re-decoding the data with the first encryption key.

According to an aspect of an exemplary embodiment, there is provided a non-transitory computer-readable recording medium recording a program thereon for executing the VPN providing method for allowing access of a user device to a private network via a VPN service apparatus relaying transmission and reception of data to and from the user device, the method including: generating a first public key and a first private key; registering the first public key with the VPN service apparatus; obtaining a registration of a second public key generated by the user device; authenticating the user device with the second public key; and transmitting and/or receiving data to/from the user device through a first VPN tunnel, wherein the data is relayed through the first VPN tunnel which is between the VPN service apparatus and the user device if the user device is authenticated as a result of the authenticating.

BRIEF DESCRIPTION OF THE DRAWINGS

The above and other objects, features and aspects will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments will be described in detail below with reference to the accompanying drawings. While the present invention is shown and described in connection with exemplary embodiments thereof, it will be apparent to those skilled in the art that various modifications can be made without departing from the spirit and scope of the invention.

A method and apparatus for providing a virtual private network (VPN) service based on mutual authentication according to an exemplary embodiment will be described in detail with reference to the accompanying drawings.

Figure 1:
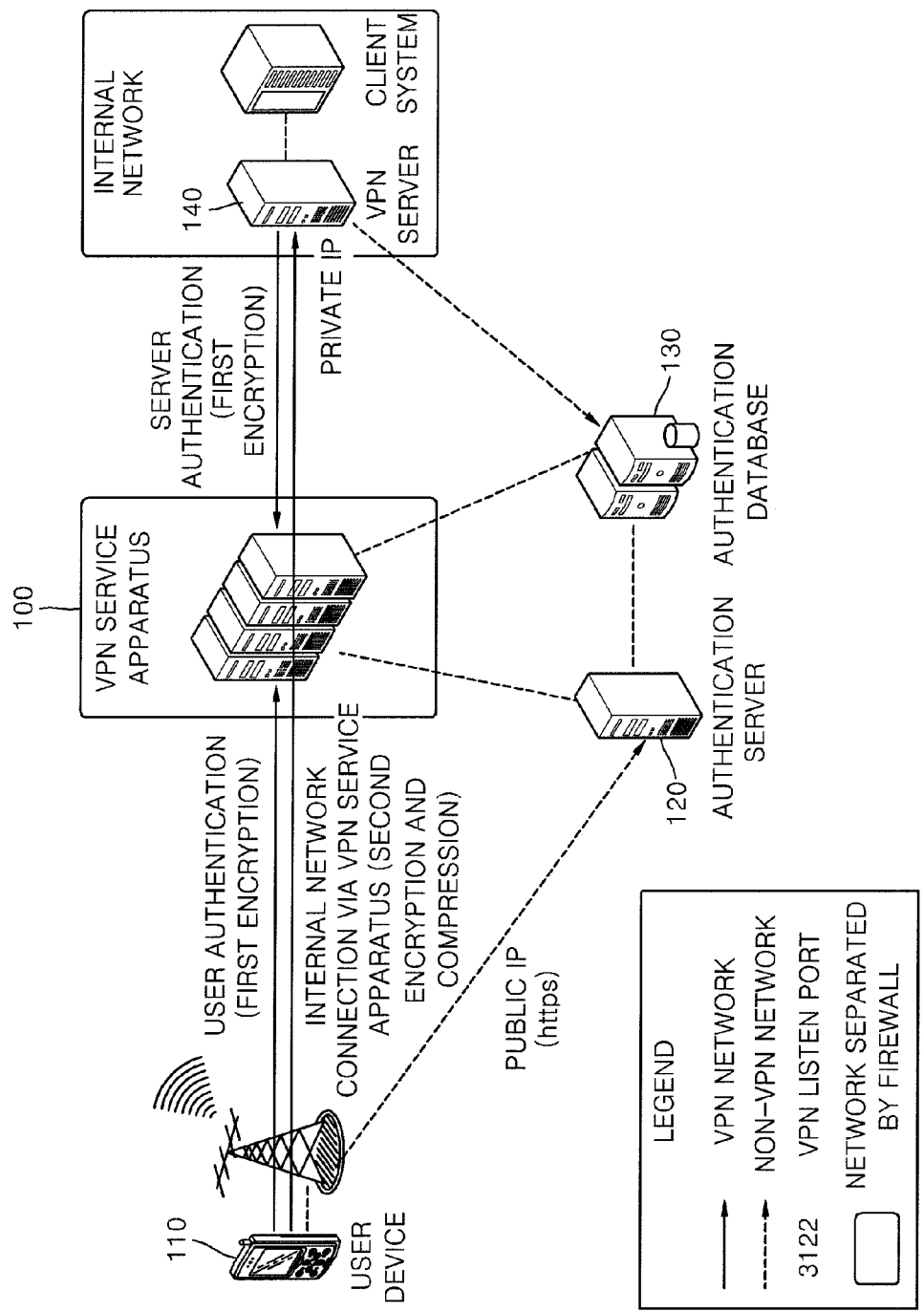
FIG. 1 is a diagram illustrating an overall network configuration including a virtual private network (VPN) service apparatus based on mutual authentication according to an exemplary embodiment.

FIG. 1 is a diagram illustrating an overall network configuration including a VPN service apparatus 100 based on mutual authentication according to an embodiment.

Referring to FIG. 1, a network includes a VPN service apparatus 100, a user device 110, an authentication server 120, an authentication database 130, and a VPN server 140.

The user device 110, also referred to as user equipment, may be a device in which a program for allowing access to the VPN server 140 is installed and performed. An example of the user device 110 may include portable communication equipment such as a personal digital assistant (PDA), a smartphone, and a laptop computer, each capable of using a public network. However, other exemplary embodiments are not limited thereto.

Figure 2:
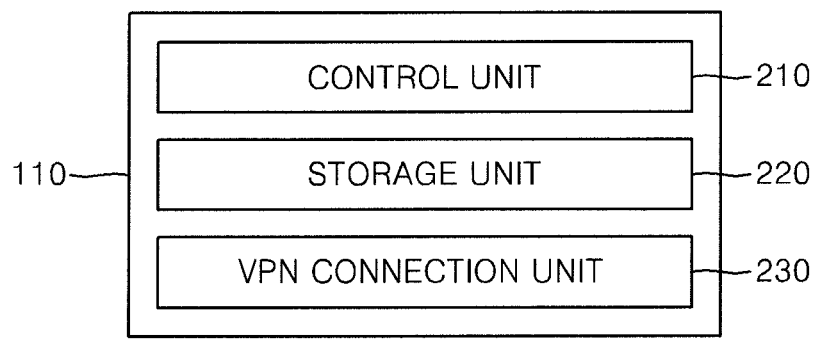
FIG. 2 is a block diagram illustrating a configuration of a user device according to an exemplary embodiment.

FIG. 2 is a block diagram illustrating a configuration of an exemplary embodiment of the user device 110.

Referring to FIG. 2, the user device 110 includes a control unit 210, a storage unit 220, and a VPN connection unit 230. The term "unit" as used herein means a hardware component, such as a processor or circuit, and/or a software component that is executed by a hardware component such as a processor.

The VPN connection unit 230 executes a VPN client program for allowing the user device 110 to access the VPN server 140. An operating system (OS) is pre-installed on the control unit 210. The OS logically connects and controls hardware components in the user device 110. Further, the OS links various application programs such as a VPN client program to the hardware components in the user device 110 and controls them.

The storage unit 220 stores instructions and data in an electronic format. When the user device 110 is operated normally, the storage unit 220 commonly stores with a major portion of the OS, all or part of application programs, the currently used data, and so on.

Figure 3:
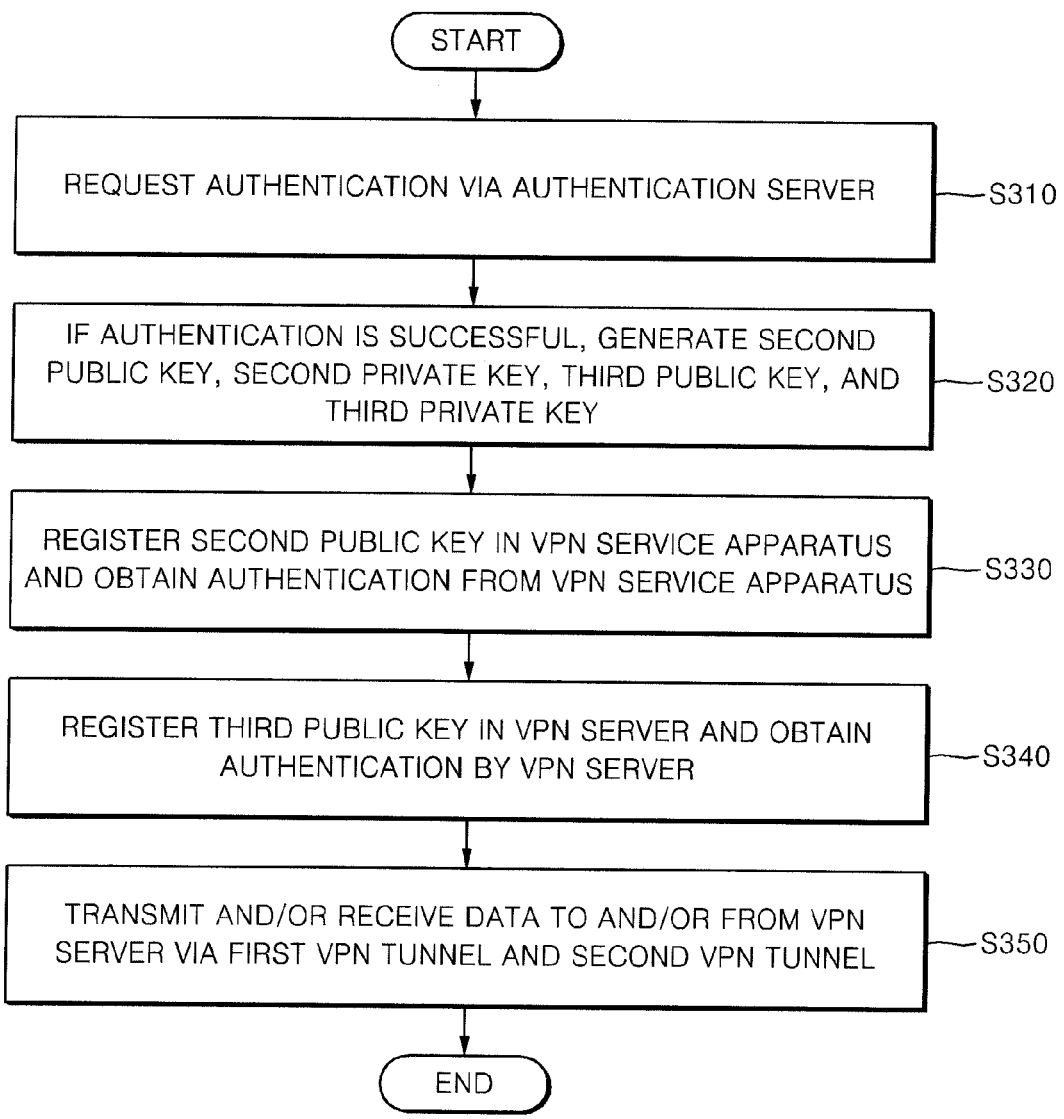
FIG. 3 is a flowchart illustrating a procedure for executing a VPN client program capable of accessing a user device through a VPN server according to an exemplary embodiment.

FIG. 3 is a flowchart illustrating a procedure for performing an access of a VPN connection unit 230 to a VPN server 140 according to an exemplary embodiment.

The VPN connection unit 230 transmits authentication data and an authentication request to the authentication server 120, which may send the authentication request to the VPN server 140 (S310). The authentication data includes identification information (ID) of the VPN server 140 to be accessed. Then, the authentication server 120 may access the VPN server 140 using an ID of the VPN server 140 included in the authentication data and request authentication for the user device 110 (S310).

The authentication data and authentication request are transmitted to the authentication server 120 using a public internet protocol (IP). The authentication data includes an ID of the VPN server 140 to be accessed, an ID of the user device 110, and an access password of the VPN server 140.

When the authentication by the VPN server 140 is successful, the VPN connection unit 230 generates a second public key, a second private key, a third public key, and a third private key (S320).

The VPN connection unit 230 registers the second public key in a VPN service apparatus 100 and obtains authentication from the VPN service apparatus 100 using the public key (S330). Specifically, when the VPN connection unit 230 requests access to the VPN service apparatus 100 according to a preset authentication protocol, an algorithm to be used between them is selected.

In this case, the algorithm to be used between them includes an encryption algorithm, a hash algorithm, a Hash-based Message Authentication Code (HMAC) algorithm, and a compression algorithm. After an algorithm to be used is selected, a symmetric key (second encryption key) to be used in the algorithm (e.g., Advanced Encryption Standard (AES), Triple Data Encryption Algorithm (3DES)) is generated and exchanged between them. The second encryption key is randomly regenerated and exchanged in a periodic manner.

The VPN connection unit 230 then encrypts the ID of the VPN server 140, the ID of the user device 110 and the second private key using the second encryption key as the symmetric key, and requests the VPN service apparatus 100 to authenticate the VPN connection unit 230. The VPN service apparatus 100 authenticates the VPN connection unit 230 using the second public key.

The VPN connection unit 230 registers the third public key in the VPN server 140, and then the VPN server 140 authenticates the VPN connection unit 230 using the third public key (S340). Specifically, when the VPN connection unit 230 requests access to the VPN server 140 according to a preset authentication protocol, an algorithm to be used between them is selected.

In this case, the algorithm to be used between them includes an encryption algorithm, a hash algorithm, an HMAC algorithm, and a compression algorithm. After an algorithm to be used is selected, a symmetric key (first encryption key) to be used in the algorithm (e.g., AES, 3DES) is generated and exchanged between them. The first encryption key is randomly regenerated and exchanged in a periodic manner.

The VPN connection unit 230 then encrypts the ID of the VPN server 140, the ID of the user device 110, and the third private key using the first encryption key as the symmetric key, and requests the VPN server 140 to authenticate the VPN connection unit 230. The VPN server 140 authenticates the VPN connection unit 230 using the third public key.

The VPN connection unit 230 transmits and receives data to and from the VPN server 140 via a first VPN tunnel and a second VPN tunnel (S350). Through the second VPN tunnel, the data is transferred between the user device 110 and the VPN service apparatus 100. Through the first VPN tunnel, the data is transferred between the VPN service apparatus 100 and the VPN server 140.

The VPN connection unit 230 encodes the data to be transmitted to the VPN server 140 using the first encryption key, and decodes the data received from the VPN server 140 using the first encryption key, so that the VPN connection unit 230 may transmit and receive the data to and from the VPN server 140. Alternatively, the VPN connection unit 230 encodes the data to be transmitted to the VPN server 140 using the second encryption key, and decodes the data received from the VPN server 140 using the second encryption key, so that the VPN connection unit 230 may transmit and receive the data to and from the VPN server 140.

Furthermore, the VPN connection unit 230 encodes data to be transmitted to the VPN server 140 using the first encryption key and then re-encodes the data using the second encryption key. The VPN connection unit 230 decodes data received from the VPN server 140 using the second encryption key and then re-decodes the data using the first encryption key. It is therefore possible to improve the network security in the transmission and reception of data.

The VPN client program may be downloaded to and used in the user device 110 as an application from an operator side responsible for the VPN server 140. Alternatively, the VPN client program may be pre-loaded on the user device 110.

Again referring to FIG. 1, the authentication server 120 performs an initial registration process for connecting the user device 110 to the VPN server 140.

The VPN server 140 requests the authentication server 120 to issue a license key. The authentication server 120, when receiving the request for issuing the license key from the VPN server 140, issues and transmits the license key to the VPN server 140. The authentication server 120 then stores the ID of the VPN server 140 to which the license key is issued in the authentication database 130. The authentication database 130 may include an ID of the VPN server 140, as well as other information.

The authentication server 120 requests the VPN server 140 to perform authentication using the license key. The VPN server 140 verifies the license key to authenticate the authentication server 120, and then generates a first public key and a first private key.

Furthermore, the authentication server 120 encodes license information using the license key. An example of the license information includes an ID of the VPN server 140, a license type, a license time-out period, the number of the user device 110, the number of the VPN server 140, and a major IP address and a port (e.g., port 3122). The license information encoded using the license key is transmitted from the authentication server 120 to the VPN server 140 via a general web server.

On the other hand, the authentication server 120 receives the authentication data and authentication request from the user device 110. The authentication data includes an ID of the VPN server 140 to be accessed, an ID of the user device 110, and an access password of the VPN server 140. The authentication server 120 stores the authentication data received from the user device 110 in the authentication database 130. The authentication server 120 also accesses the VPN server 140 using the ID of the VPN server 140 included in the authentication data, thereby requesting authentication of the user device 110.

When the user device 110 is authenticated by the VPN server 140, the authentication server 120 informs the user device 110 that the authentication is successful. The user device 110, after learning that the authentication is successful from the authentication server 120, generates a second public key, a second private key, a third public key, and a third private key, thereby preparing to transmit and/or receive data to and/or from the VPN server 140.

Again referring to FIG. 1, the VPN service apparatus 100 according to an exemplary embodiment may be located in a network operation center (NOC) or a demilitarized zone (DMZ), which is a neutral area between a private network and a public network.

Figure 4:
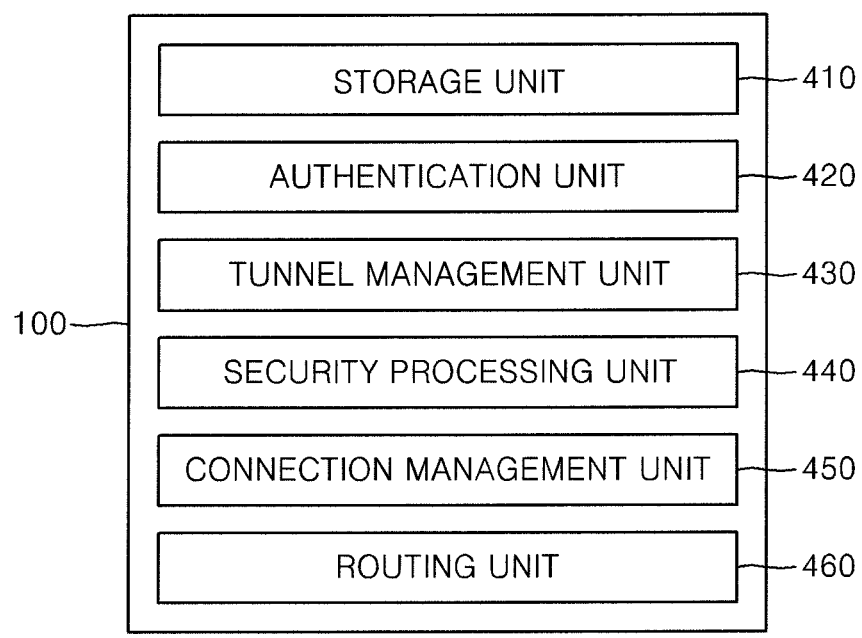
FIG. 4 is a block diagram illustrating a configuration of a VPN service apparatus according to an exemplary embodiment.

FIG. 4 is a block diagram illustrating a configuration of an exemplary embodiment of a VPN service apparatus 100 according to an exemplary embodiment.

Referring to FIG. 4, the VPN service apparatus 100 according to an exemplary embodiment includes a storage unit 410, an authentication unit 420, a tunnel management unit 430, a security processing unit 440, a connection management unit 450, and a routing unit 460.

The storage unit 410 stores a first public key generated by the VPN server 140 and a second public key generated by the user device 110. As mentioned above, the VPN server 140 verifies the license key to authenticate the authentication server 120, and then generates the first public key and the first private key. The user device 110, when authenticated by the VPN server 140, generates a second public key and a second private key.

The authentication unit 420 authenticates the VPN server 140 using the first public key and authenticates the user device 110 using the second public key. In detail, when the VPN server 140 requests an access to the authentication unit 420 according to a preset authentication protocol, an algorithm to be used between them is selected.

In this case, the algorithm to be used between them includes an encryption algorithm, a hash algorithm, an HMAC algorithm, and a compression algorithm. After an algorithm to be used is selected, a symmetric key (third encryption key) to be used in the algorithm (e.g., AES, 3DES) is generated and exchanged between them. The third encryption key is randomly regenerated and exchanged in a periodic manner.

The VPN server 140 then encodes the ID of the VPN server 140, the ID of the user device 110 and the first private key using the third encryption key as the symmetric key, and requests the authentication unit 420 to perform authentication. The authentication unit 420 authenticates the VPN server 140 using the first public key. That is, the authentication is implemented in an out-bound process by access to the VPN server 140.

In a similar way, when the user device 110 requests access to the authentication unit 420 according to a preset authentication protocol, an algorithm to be used between them is selected. In this case, the algorithm to be used between them includes an encryption algorithm, a hash algorithm, an HMAC algorithm, and a compression algorithm. After an algorithm to be used is selected, a symmetric key (second encryption key) to be used in the algorithm (e.g., AES, 3DES) is generated and exchanged between them. The second encryption key is randomly regenerated and exchanged in a periodic manner.

The user device 110 then encodes the ID of the VPN server 140, the ID of the user device 110 and the second private key using the second encryption key as the symmetric key, and requests the authentication unit 420 to perform authentication. The authentication unit 420 authenticates the user device 110 using the second public key.

The tunnel management unit 430 generates a first VPN tunnel and a second VPN tunnel to relay transmission and/or reception of data between the user device 110 and the VPN server 140. The data is transferred through the first VPN tunnel to or from the VPN server 140 which is authenticated by the authentication unit 420. Through the second VPN tunnel, the data is transferred to or from the user device 110 which is authenticated by the authentication unit 420.

The data which is transmitted and/or received between the user device 110 and the VPN server 140 through the first and second VPN tunnels may be encoded by the first encryption key preset between the user device 110 and the VPN server 140.

The security processing unit 440, when receiving data from the user device 110, decodes the data using the second encryption key preset in conjunction with the user device 110, encodes it using the third encryption key preset in conjunction with the VPN server 140, and then transmits it to the VPN server 140. The security processing unit 440, when receiving data from the VPN server 140, decodes the data using the third encryption key, encodes it with the second encryption key, and then transmits it to the user device 110.

The security processing unit 440 may encode the data received from the user device 110 using the first encryption key, and then re-encode it with the second encryption key. Alternatively, the security processing unit may encode the data received from the VPN server 140 using the first encryption key, and then re-encode it with the third encryption key. That is, the security processing unit 440 can transmit and receive the re-encoded data.

The connection management unit 450, when receiving a request to access the VPN server 140 from the user device 110, determines that the VPN server 140 can be connected to the user device 110 on the basis of information in the authentication database 130, in which the information is associated and stored with information of at least one user device 110 allowed to access a plurality of VPN servers 140 respectively.

The information of the at least one user device 110 allowed to access the plurality of VPN servers 140 respectively may be pre-stored within the authentication database 130, or may be received from the VPN server 140 and stored in the authentication database 130.

Furthermore, when any information related to at least one user device 110 allowed to access to a plurality of VPN servers 140 is the same, the plurality of VPN servers 140 have the same ID and different sub-IDs of the same ID. In this case, the connection management unit 450, when receiving a request to access to the VPN server 140 from the user device 110, decides a VPN server 140 to be connected to the user device 110 such that the load resulting from access of the user device 110 may be equally distributed among the VPN servers 140 having the same ID. Table 1 shows a user device 110 that can access VPN servers 140 having the same VPN ID but different sub-IDs.

TABLE 1

| VPN ID | VPN sub-ID | Accessible user devices |
|--------|------------|------------------------|
| A      | a, b       | 1, 2, 3, 4             |

When the VPN servers 140 have the same accessible user devices 110 (1, 2, 3, and 4), the VPN servers 140 have the same VPN ID (A) but different VPN sub-IDs (a and b). The sub-ID may be a port number of an actual VPN server 140.

When a user device 1 is connected to a VPN server having sub-ID a, the connection management unit 450 decides a VPN server having sub-ID b to be connected to a user device 2 upon receiving a request for access to the VPN server 140 from the user device 2.

The routing unit 460, when receiving a request for access to a VPN server 140 from the user device 110, establishes a connection of a routing path for the user device 110 to the VPN service apparatus 100 establishing a VPN tunnel in conjunction with the VPN server 140 accessible by the user device 110.

The plurality of VPN service apparatus 100 are interconnected in a broadcasting way. Therefore, the routing unit 460 can search for the VPN service apparatus 100 establishing a first VPN tunnel in conjunction with the VPN server 140 accessible by the user device 110.

Again referring to FIG. 1, the VPN server 140 is responsible for managing access of the VPN service apparatus 100 and the user device 110 to a client system. The VPN server 140 is located within a private network separated by firewalls of the client system.

Figure 5:
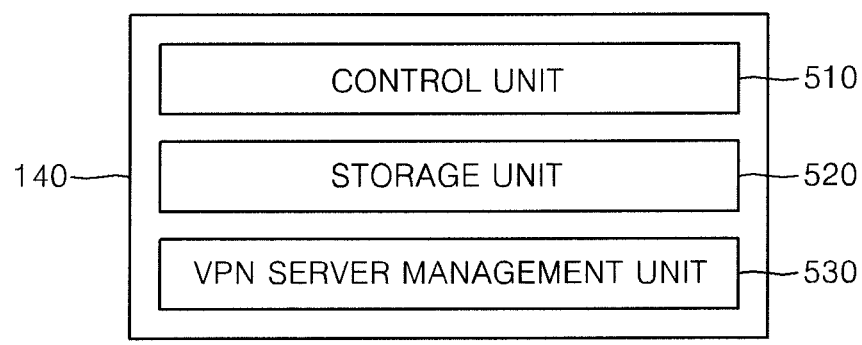
FIG. 5 is a block diagram illustrating a configuration of a VPN server according to an exemplary embodiment.

FIG. 5 is a block diagram illustrating a configuration of an exemplary embodiment of the VPN server 140.

Referring to FIG. 5, the VPN server 140 includes a control unit 510, a storage unit 520, and a VPN server management unit 530.

The VPN server management unit 530 executes a VPN program for allowing access of the VPN server 140 to the user device 110. An OS is pre-installed on control unit 510. The OS logically connects hardware components in the VPN server 140 to each other and controls them. Further, the OS links various application programs such as a VPN program to the hardware components in the VPN server 140 and controls them.

The storage unit 520 stores instructions and data in an electronic format. When the VPN server 140 is operated normally, the storage unit 220 commonly stores a major portion of the OS, all or part of application programs, the currently used data, and so on.

Figure 6:
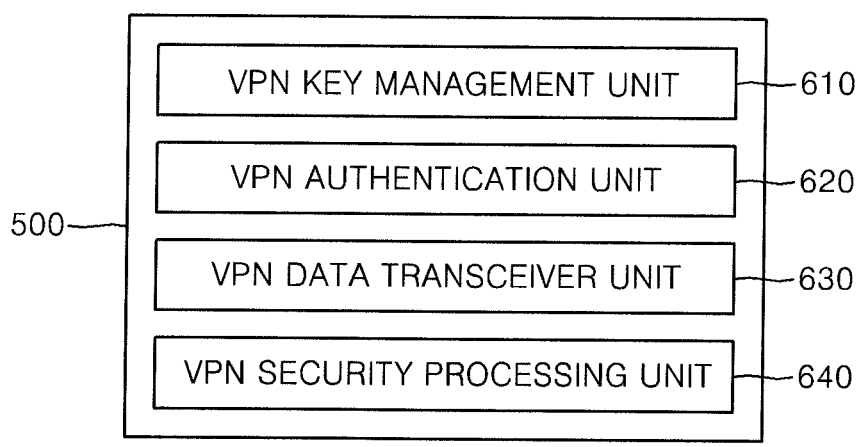
FIG. 6 is a block diagram illustrating a configuration of a VPN server management unit according to an exemplary embodiment.

FIG. 6 is a block diagram illustrating a configuration of an exemplary embodiment of the VPN server management unit 530.

Referring to FIG. 6, the VPN server management unit 530 includes a VPN key management unit 610, a VPN authentication unit 620, a VPN data transceiver unit 630, and a VPN security processing unit 640.

The VPN key management unit 610 generates a first public key and a first private key, and registers the first public key in the VPN service apparatus 100. In the VPN key management unit 610, a third public key which is generated from the user device 110 is registered.

The VPN authentication unit 620 authenticates the user device 110 using the third public key. Specifically, when the user device 110 requests access using the third private key, the VPN authentication unit 620 authenticates the user device 110 using the third public key. In other words, when the user device 110 requests access to the VPN authentication unit 620 according to a preset authentication protocol, an algorithm to be used between them is selected.

In this case, the algorithm to be used between them includes an encryption algorithm, a hash algorithm, an HMAC algorithm, and a compression algorithm. After an algorithm to be used is selected, a symmetric key (first encryption key) to be used in the algorithm (e.g., AES, 3DES) is generated and exchanged between them. The first encryption key is randomly regenerated and exchanged in a periodic manner.

The user device 110 then encodes the ID of the VPN server 140, the ID of the user device 110 and the third private key using the first encryption key as the symmetric key, and requests the VPN authentication unit 620 to perform authentication. The VPN authentication unit 620 authenticates the user device 110 using the third public key.

The VPN data transceiver unit 630 transmits and receives the data to and from the user device 110 via a first VPN tunnel and a second VPN tunnel. Through the first VPN tunnel, the data is transferred between the VPN server 140 and the VPN service apparatus 100 which authenticates the VPN server 140 using the first public key. Through the second VPN tunnel, the data is transferred between the VPN service apparatus 100 and the user device 110 which is authenticated by the authentication unit 620.

The data transmitted to the user device 110 via the VPN data transceiver unit 630 may be encoded using a first encryption key which is preset in conjunction with the user device 110. The data received from the user device 110 via the VPN data transceiver unit 630 may be decoded using the first encryption key.

The VPN security processing unit 640 encodes the data to be transmitted to the user device 110 using the first encryption key preset in conjunction with the user device 110, and then re-encodes it using the third encryption key preset in conjunction with the VPN service apparatus 100. The VPN security processing unit 640, when receiving data from the user device 110, decodes the data using the third encryption key and then re-decodes it using the first encryption key. It is therefore possible to improve the communication security by re-encoding data to be transmitted to the user device 110.

Again referring to FIG. 1, the authentication database 130 receives and stores various types of information from the authentication server 120 and the VPN server 140 across the network. As mentioned above, the authentication server 120 stores the authentication data received from the user device 110 in the authentication database 130.

The authentication data includes an ID of the VPN server 140, an ID of the user device 110, and an access password of the VPN server 140. The VPN server 140 can authenticate the user device 110 on the basis of authentication data stored in the authentication database 130. Further, the authentication server 120 stores the ID of the VPN server 140 issuing a license key in the authentication database 130.

The information of at least one user device 110 allowed to access a plurality of VPN servers 140 respectively is stored in the authentication database 130. Furthermore, the VPN server 140 stores the information on the VPN server 140 including the ID of the VPN server 140 in the authentication database 130.

Meanwhile, the authentication database 130 stores an ID and a sub-ID of the VPN server 140 as mentioned above, and information of the at least one user device 110 for which access is allowed. This information may be received from the VPN server 140 and stored, or may be pre-stored during construction of the authentication database 130.

Figure 7:
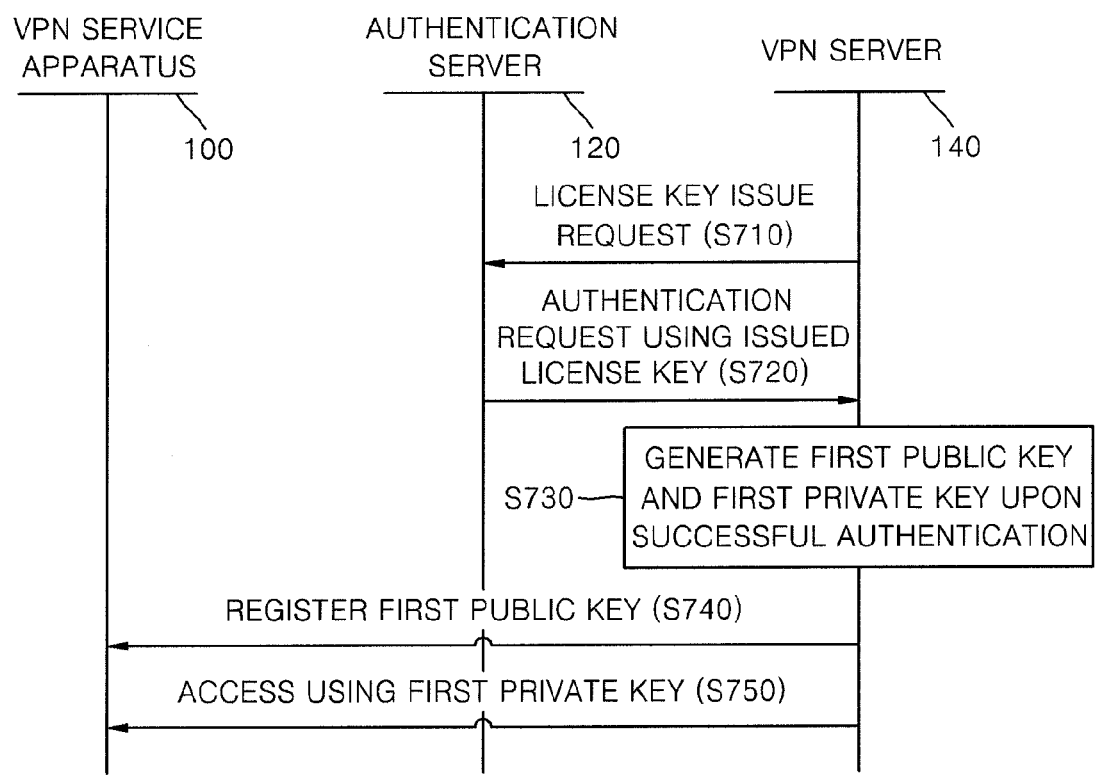
FIG. 7 is a flowchart illustrating a procedure for establishing a first VPN tunnel between a VPN service apparatus and a VPN server according to an exemplary embodiment.

FIG. 7 is a flowchart illustrating a procedure for establishing a first VPN tunnel between a VPN service apparatus 100 and a VPN server 140 according to an exemplary embodiment.

The VPN server 140 requests an authentication server 120 to issue a license key (S710). In response, the authentication server 120 issues the license key and transmits it to the VPN server 140. The authentication server 120 requests the VPN sever 140 to perform authentication using the issued license key (S720). The VPN server 140 authenticates the authentication server 120 using the license key and generates a first public key and a first private key (S730).

The VPN server 140 registers the generated first public key in the VPN service apparatus 100 (S740). The VPN server 140 then accesses the VPN service apparatus 100 and is authenticated using the first private key (S750). Specifically, the VPN server 140 encodes and transmits the first private key using a preset third encryption key. The VPN service apparatus 100 then authenticates the VPN server 140 using the registered first public key. When the authentication is successful, a first VPN tunnel is generated between the VPN service apparatus 100 and the VPN server 140. The data encoded using the third encryption key can be transferred through the first VPN tunnel.

Figure 8:
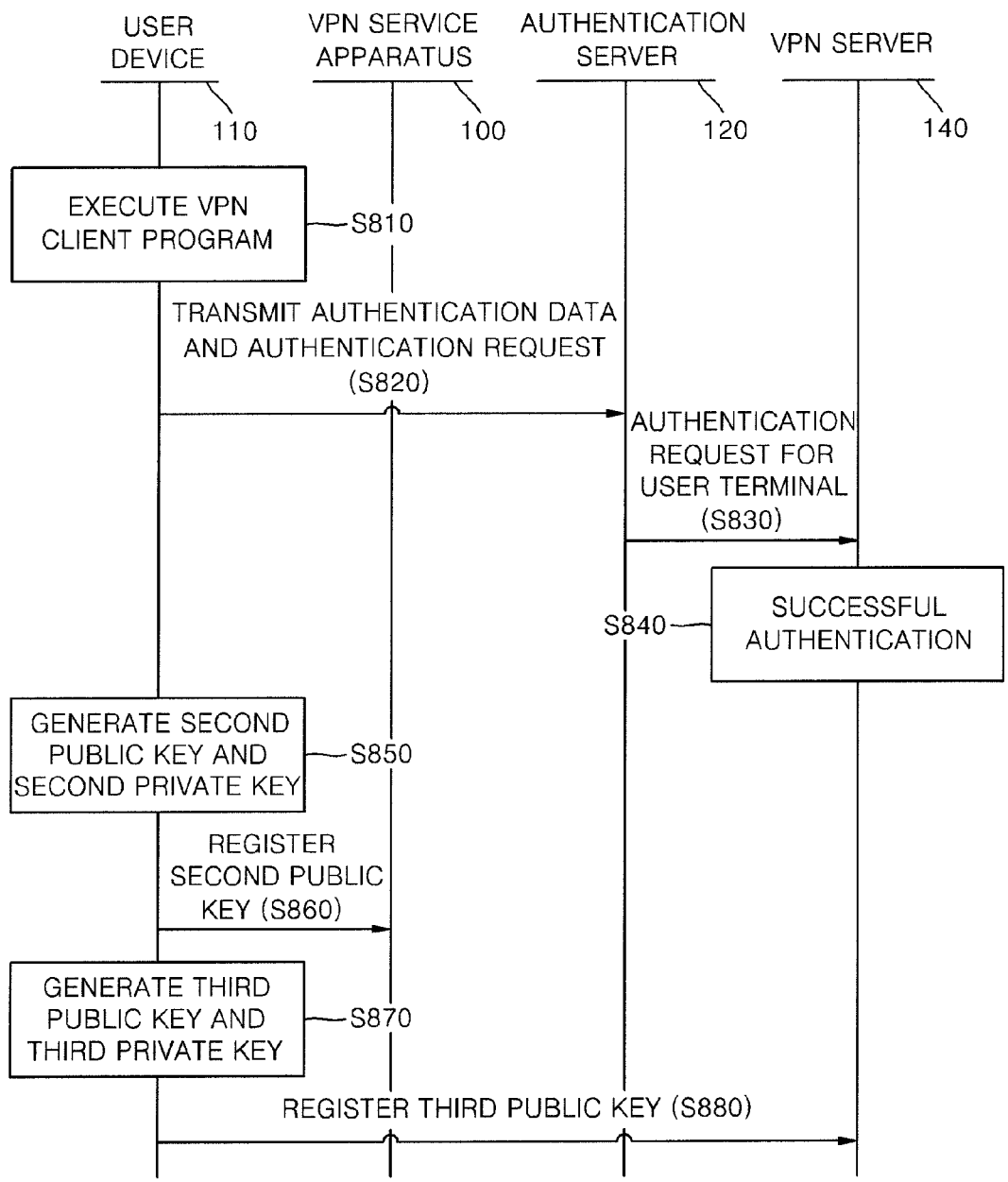
FIG. 8 is a flowchart illustrating a procedure for establishing a second VPN tunnel between a VPN service apparatus and a user device according to an exemplary embodiment.

FIG. 8 is a flowchart illustrating a procedure for establishing a second VPN tunnel between a VPN service apparatus 100 and a user device 110 according to an exemplary embodiment.

The user device 110 executes a VPN client program that can access a VPN server 140 (S810). When the VPN client program is executed, the user device 110 transmits authentication data and an authentication request to an authentication server 120 (S820). The authentication data may include an ID of the VPN server 140, an ID of the user device 110, and an access password of the VPN server 140, etc., as mentioned above.

The authentication server 120 stores the received authentication data in an authentication database 130, accesses the VPN server 140 using the ID of the VPN server 140 included in the authentication data, and requests authentication for the user device 110 (S830). The VPN server 140 authenticates the user device 110 on the basis of the authentication data stored in the authentication database 130 (S840).

The user device 110 then generates a second public key and a second private key (S850), and registers the second public key in the VPN service apparatus 100 (S860). The user device 110 encodes the second private key using a preset second encryption key and transmits it to the VPN service apparatus 100. The VPN service apparatus 100 authenticates the user device 110 using the registered second public key and generates a second VPN tunnel through which data is transmitted and received between the VPN service apparatus 100 and the user device 110. Through this tunnel, data encoded using the second encryption key may be transferred between the VPN service apparatus 100 and the user device 110.

Furthermore, the user device 110 generates a third public key and a third private key (S870), and registers the third public key in the VPN server 140 (S880). The third public key is registered in the VPN server 140 through a first VPN tunnel between the VPN service apparatus 100 and the VPN server 140. The user device 110 encodes the third private key using a preset first encryption key and transmits it to the VPN server 140. The VPN server 140 authenticates the user device 110 using the registered third public key.

Data encoded using the first encryption key can be transmitted and received through the second VPN tunnel between the VPN service apparatus 100 and the user device 110 which is authenticated using the third public key, and the first VPN tunnel between the VPN service apparatus 100 and the VPN server 140.

Figure 9:
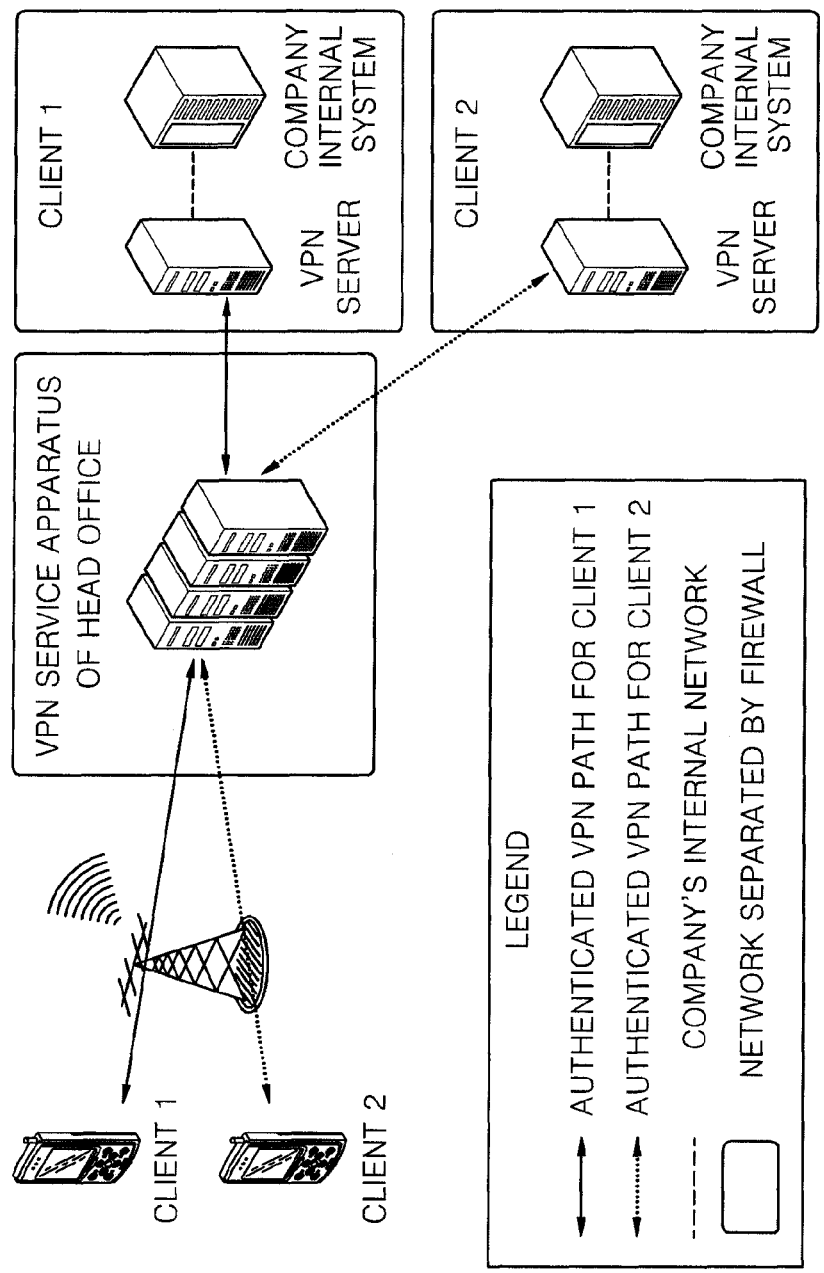
FIG. 9 is a diagram illustrating an exemplary embodiment in which a plurality of clients are managed by a VPN service apparatus according to an exemplary embodiment.

FIG. 9 is a diagram illustrating an exemplary embodiment in which a plurality of clients are managed by the VPN service apparatus 100 according to an exemplary embodiment.

The VPN service apparatus 100 performs customer-specific authentication processes and establishes a tunnel for transmitting and receiving data to provide an authenticated VPN path. That is to say, a user device of a customer 1 may access a VPN server of the customer 1 using the VPN path authenticated for the customer 1, but cannot use the VPN path authenticated for a customer 2.

In the VPN path authenticated for the customer 2, transmission or reception of data may be implemented using an encryption key between a user device of the customer 2 and a VPN server of the customer 2. Therefore, the user device of the customer 1 cannot access the VPN path authenticated for the customer 2, and the security for each customer is maintained.

When a system is established in this way, customers can economically introduce the VPN service apparatus 100. Also, customers can establish a communication network only by authentication of the VPN service apparatus 100 after introducing the VPN server 140.

Figure 10:
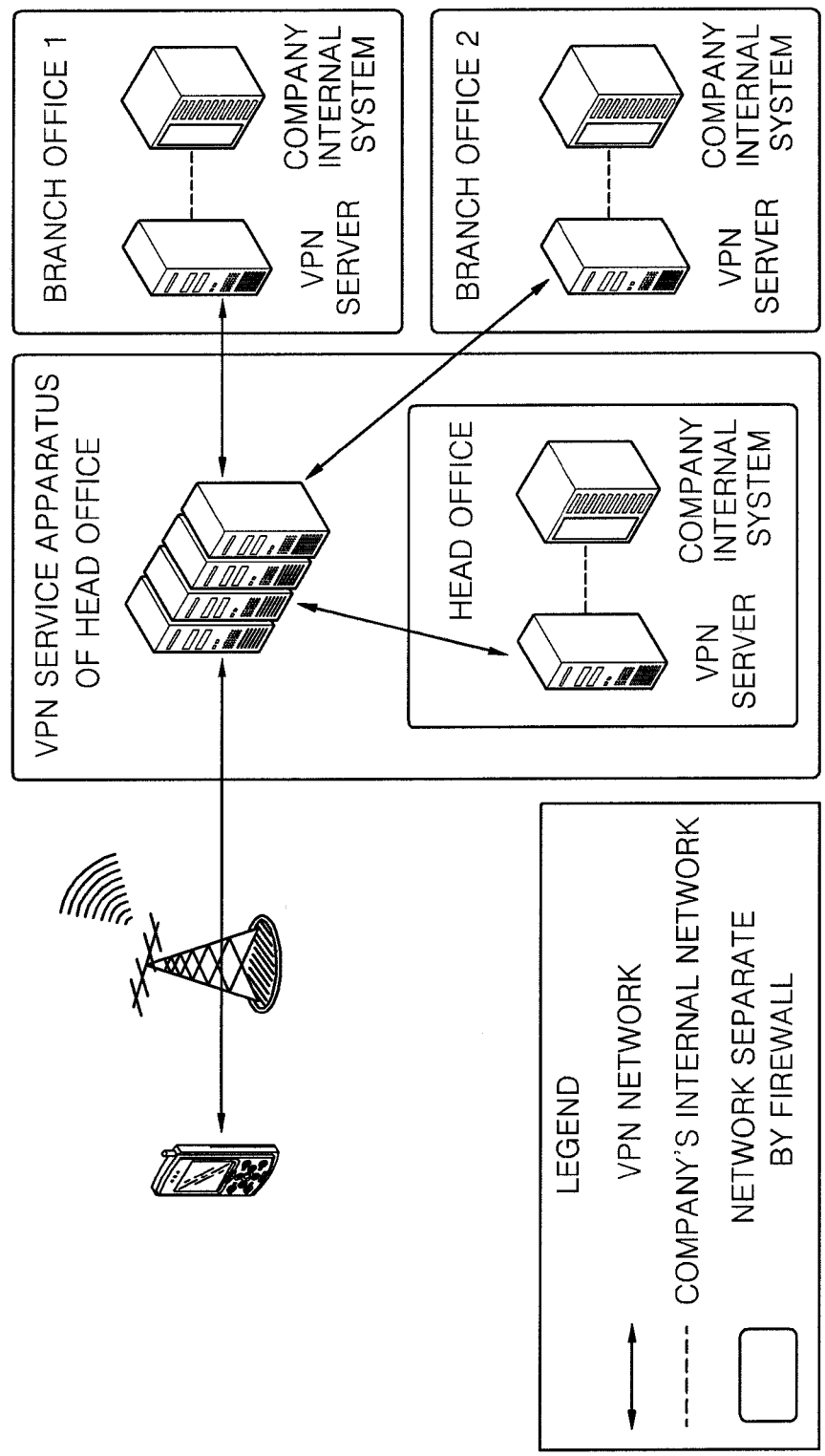
FIG. 10 is a diagram illustrating an embodiment of connecting a head office and branch offices using a VPN service apparatus according to an exemplary embodiment.

FIG. 10 is a diagram illustrating an embodiment of connecting a head office with branch offices using a VPN service apparatus 100 according to an exemplary embodiment.

In related art, in order to establish a communication network between a head office and branch offices, it is necessary to connect respective VPN servers 140. In this case, complicated network connections and firewall configurations are necessary. The method of connecting a head office with branch offices using the VPN service apparatus 100 according to an exemplary embodiment can be implemented when the VPN server in each branch office is only authenticated by the VPN service apparatus 100 in an out-bound way. In this way, the reliable connection between a head office and branch offices is enabled by the VPN service apparatus 100 located in the head office.

Furthermore, when there are a plurality of VPN service apparatus 100 to be connected, the connection conditions can be adjusted to minimize a load applied to the entire VPN service apparatus 100. To this end, the information of a user device 110 and a VPN server 140 to be connected may be preset and pre-stored in an authentication database 130 to minimize the load. Alternatively, entire connection conditions may be controlled by a system for managing the VPN service apparatus 100.

It will be understood that, although the terms "first," "second," etc. may be used herein to describe various elements, these elements should not be limited by these terms. These terms are only used to distinguish one element from another. For example, a "first public key" could be termed a "second public key" and, similarly, a "second public key" could be termed a "first public key," without departing from the scope. As used herein, the term "and/or" includes any and all combinations of one or more of the associated listed items.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Many examples described herein can be machine or computer-implemented at least in part. Some examples can include a computer-readable recording medium or machine-readable recording medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable recording media, such as during execution or at other times. Examples of these tangible computer-readable recording media can include, but are not limited to, hard disks, removable magnetic disks, removable optical discs (e.g., compact discs and digital video discs), magnetic cassettes, memory cards or sticks, compact disc read-only memories (CD-ROMs), random access memories (RAMs), read only memories (ROMs), carrier waves (e.g., transmission over the Internet), and the like.

An apparatus and method for providing a VPN service based on mutual authentication according to an exemplary embodiment provide a connection in which reliability and security are improved by means of mutual authentication between a client and a VPN server. Also, some embodiments provide an advantage that high scalability and good load balancing are achievable at a low cost by constructing a multi-tiered structure in which several servers are connected. This structure allows problems related to network compatibility and IP collision to be solved by a hosted VPN service of an application layer with no IP allocation.

Various modifications can be made to the above-described exemplary embodiments. Thus, it is intended that exemplary embodiments cover all such modifications provided they come within the scope of the appended claims and their equivalents.

What is claimed is:

1. A virtual private network (VPN) service apparatus configured to receive a first public key and a second public key, wherein the first public key is received from a VPN server and provides access by a user device to a private network, and the second public key is received from the user device, the apparatus comprising:

A memory and processor operable to perform operations comprising:
storing the first public key and the second public key, wherein the second public key is generated by the user device when the user device is authenticated by the VPN server;
authenticating the VPN server using the stored first public key and to authenticate the user device using the stored second public key;
generating a first VPN tunnel and a second VPN tunnel which respectively relay data between the user device and the VPN server, wherein the first VPN tunnel is configured to relay the data between the VPN server and the VPN service apparatus based on the authentication of the VPN server by the authentication unit, and wherein the second VPN tunnel is configured to relay the data between the VPN service apparatus and the user device based on the authentication of the user device by the authentication unit;
determining whether to connect the VPN server to the user device based on whether a load resulting from access of the user device would be equally distributed among the plurality of VPN servers having the same ID, wherein if a request to access the VPN server is received from the user device, and the VPN server is included among a plurality of VPN servers having a same identification (ID),
wherein each of the plurality of VPN servers has a different sub-ID.

2. The VPN service apparatus of claim 1, wherein the data relayed between the user device and the VPN server through the first and second VPN tunnels is encoded by a first encryption key preset between the user device and the VPN server.

3. The VPN service apparatus of claim 1, further comprising a security processing unit configured to:
decode user device data, if the data is received from the user device, with a second encryption key preset in conjunction with the user device,
encode first encoded data by encoding the decoded user device data with a third encryption key preset in conjunction with the VPN server, and transmit the first encoded data to the VPN server; and
decode VPN server data, if the data is received from the VPN server, with the third encryption key, encode second encoded data by encoding the decoded VPN server data with the second encryption key, and transmit the second encoded data to the user device.

4. The VPN service apparatus of claim 1, if a request to access the VPN server is received from the user device, the apparatus further comprises a connection management unit configured to determine whether to connect the VPN server to the user device based on information in an authentication database.

5. The VPN service apparatus of claim 1, further comprising a routing unit, wherein if a request to access the VPN server is received from the user device, the routing unit configured to establish a routing path for the user device to be connected to the VPN service apparatus generating the first VPN tunnel in conjunction with the VPN server accessible by the user device.

6. The VPN service apparatus of claim 1, wherein the tunnel management unit receives a third public key through the second VPN tunnel from the user device and transmits the third public key through the first VPN tunnel to the VPN server.

7. The VPN service apparatus of claim 1, wherein the first public key is generated when the VPN server is authenticated through an authentication server.

8. The VPN service apparatus of claim 7, wherein the VPN server requests the authentication server to issue a license key and performs authentication based on the license key.

9. A virtual private network (VPN) service method of a VPN service apparatus for providing access of a user device to a private network through a VPN server, the method comprising:
authenticating the VPN server with a first public key received from the VPN server;
authenticating by the VPN service apparatus, the user device with a second public key received from the user device;
generating a first VPN tunnel and a second VPN tunnel which respectively relay data between the VPN server and the user device; and
determining whether to connect the VPN server to the user device based on whether a load resulting from access of the user device would be equally distributed among the plurality of VPN servers having the same ID, wherein if a request to access the VPN server is received from the user device, and the VPN server is included among a plurality of VPN servers having a same identification (ID),
wherein each of the plurality of VPN servers has a different sub-ID,
wherein the first VPN tunnel relays the data to and/or from the VPN server based on the authenticating of the VPN server, wherein the second VPN tunnel relays the data to/from the user device based on the authenticating of the user device, and wherein the second public key is generated by the user device when the user device is authenticated by the VPN server.

10. The VPN service method of claim 9, wherein the data relayed between the user device and the VPN server through the first and second VPN tunnels is encoded by a first encryption key preset between the user device and the VPN server.

11. The VPN service method of claim 9, further comprising:

decoding user device data, if the data is received from the user device, with a second encryption key preset in conjunction with the user device;

encoding first encoded data by encoding the decoded user device data with a third encryption key preset in conjunction with the VPN server;

transmitting the first encoded data to the VPN server;

decoding VPN server data, if the data is received from the VPN server, with the third encryption key, encode second encoded data by encoding the decoded VPN server data with the second encryption key; and transmitting the second encoded data to the user device.

12. The VPN service method of claim 9, wherein if a request to access the VPN server is received from the user device, the method further comprises determining whether to connect the VPN server to the user device based on information in an authentication database.

13. The VPN service method of claim 10, further comprising, wherein if a request to access the VPN server is received from the user device, establishing a routing path for the user device to be connected to a VPN service apparatus generating the first VPN tunnel in conjunction with the VPN server accessible by the user device.

14. The VPN service method of claim 10, further comprising:

receiving a third public key through the second VPN tunnel; and transmitting the third public key through the first VPN tunnel to the VPN server.

15. A non-transitory computer-readable recording medium recording a program thereon for executing the virtual private network service method of claim 9.

16. The VPN service method of claim 9, further comprising:

generating the first public key when the VPN server is authenticated through an authentication server.

17. The VPN service method of claim 16, further comprising:

requesting, by the VPN server, the authentication server to issue a license key and performing authentication based on the license key.

* * * * *